United States Patent
Aggarwal et al.

(10) Patent No.: US 10,097,539 B2
(45) Date of Patent: *Oct. 9, 2018

(54) AUTHENTICATION ON A COMPUTING DEVICE

(71) Applicant: Google LLC, Mountain View, CA (US)

(72) Inventors: Vikram Aggarwal, Palo Alto, CA (US); Jiten Vaidya, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,273

(22) Filed: Oct. 11, 2017

(65) Prior Publication Data

US 2018/0034803 A1 Feb. 1, 2018

Related U.S. Application Data

(63) Continuation of application No. 15/406,981, filed on Jan. 16, 2017, now Pat. No. 9,800,573, which is a (Continued)

(51) Int. Cl.
*H04L 29/06* (2006.01)
*H04L 9/32* (2006.01)
(Continued)

(52) U.S. Cl.
CPC ............ *H04L 63/083* (2013.01); *G06F 21/42* (2013.01); *H04L 9/32* (2013.01); *H04L 9/321* (2013.01);
(Continued)

(58) Field of Classification Search
CPC . G06F 21/44; G06F 7/04; G06F 21/42; H04L 9/32; H04L 63/0853; H04L 63/083; H04L 63/061; H04L 9/321; H04L 9/3226
(Continued)

(56) References Cited

U.S. PATENT DOCUMENTS 8,392,971 B1 3/2013 Kates et al.
8,689,296 B2 4/2014 Shewchuk et al.
(Continued)

FOREIGN PATENT DOCUMENTS

EP 2384040 A1 11/2011
WO 2011103916 A1 9/2011
(Continued)

OTHER PUBLICATIONS

Office Action from U.S. Appl. No. 13/438,656, dated Apr. 18, 2013, 31 pp.
(Continued)

*Primary Examiner* — Thanhnga B Truong
(74) *Attorney, Agent, or Firm* — Shumaker & Sieffert, P.A.

(57) ABSTRACT

Systems and/or methods provide a user of a first computing device with the ability to authenticate themselves on a remotely provided process or service using a second computing device on which the user is already authenticated. For example, the techniques of this disclosure provide a user with the ability to securely log into a remotely provided service or application (such as e-mail, cloud computing service, etc.) on a first computing device (e.g., a desktop computer, laptop, tablet, etc.) using a second computing device (e.g., mobile phone) on which the user is already logged into the service or application, without requiring manual entry of authentication information on the first computing device.

20 Claims, 4 Drawing Sheets

Related U.S. Application Data continuation of application No. 13/438,676, filed on Apr. 3, 2012, now Pat. No. 9,571,282.

(51) Int. Cl.
*G06F 21/42* (2013.01)
*G06F 21/00* (2013.01)

(52) U.S. Cl.
CPC .......... *H04L 9/3226* (2013.01); *H04L 63/061* (2013.01); *H04L 63/0853* (2013.01); *G06F 21/00* (2013.01)

(58) Field of Classification Search
USPC .............................. 713/171; 726/3, 5, 7, 19
See application file for complete search history.

(56) References Cited

U.S. PATENT DOCUMENTS

| | | |
|---|---|---|
| 8,856,957 B1 | 10/2014 | Roth et al. |
| 9,098,678 B2 | 8/2015 | Hao et al. |
| 9,571,282 B1 | 2/2017 | Aggarwal et al. |
| 9,800,573 B1 | 10/2017 | Aggarwal et al. |
| 2004/0003252 A1 | 1/2004 | Dabbish et al. |
| 2004/0185839 A1 | 9/2004 | Seligmann et al. |
| 2005/0086493 A1 | 4/2005 | Ishidoshiro |
| 2006/0224882 A1 | 10/2006 | Chin |
| 2010/0251353 A1 | 9/2010 | Hodgkinson |
| 2010/0268955 A1 | 10/2010 | Ohno et al. |
| 2011/0040971 A1 | 2/2011 | Lakshminarayanan et al. |
| 2011/0219427 A1* | 9/2011 | Hito ....................... G06F 21/00 726/3 |
| 2011/0270751 A1 | 11/2011 | Csinger et al. |
| 2011/0271099 A1 | 11/2011 | Preiss et al. |
| 2011/0319056 A1 | 12/2011 | Toy et al. |
| 2012/0117629 A1 | 5/2012 | Miyazawa et al. |
| 2012/0144501 A1 | 6/2012 | Vangpat et al. |
| 2012/0239936 A1 | 9/2012 | Holtmanns et al. |
| 2013/0036476 A1 | 2/2013 | Roever et al. |
| 2013/0191884 A1 | 7/2013 | Leicher et al. |
| 2014/0007195 A1 | 1/2014 | Gupta |
| 2014/0075513 A1 | 3/2014 | Trammel et al. |
| 2014/0095874 A1 | 4/2014 | Desai et al. |
| 2014/0143837 A1 | 5/2014 | Fletcher et al. |
| 2014/0189841 A1 | 7/2014 | Metke et al. |
| 2014/0223516 A1 | 8/2014 | Vongsouvanh et al. |
| 2015/0249659 A1 | 9/2015 | Vongsouvanh et al. |
| 2018/0077140 A1 | 3/2018 | Vongsouvanh et al. |

FOREIGN PATENT DOCUMENTS

| | | |
|---|---|---|
| WO | 2012069263 A2 | 5/2012 |
| WO | 2012156785 A1 | 11/2012 |

OTHER PUBLICATIONS

Pash. "Automate Proximity and Location-Based Computer Actions", [online]. Lifehacker, Jun. 5, 2007. Retrieved from the Internet: <http:I/lifehacker.com/265822/automate-proximity-and-location+based-computer-actions> 3 pgs.

"BiueProximity", [online]. Sourceforge. First Accessed on Mar. 25, 2011. Retrieved from the Internet: <http://blueproximity.sourceforge.nel/> 1 pg.

"BiueProximity manual", [online]. Sourceforge. First Accessed on Mar. 25, 2011. Retrieved from the Internet: <http://blueproximity.sourceforge.nel/manual.html> 10 pgs.

"LockItNow! FAQ", [online]. Bluetooth Shareware. First Accessed on Mar. 25, 2011. Retrieved from the Internet: <http://www.blueshareware.com/lockitnow_faq.asp> 2 pgs.

"BlueProximity manual", [online]. Sourceforge. First Accessed on Mar. 25, 2011. Retrieved from the Internet: <http://blueproximity.sourceforge.nel/manual.html> 10 pgs.

"LockItNow! 1.2", [online]. Bluetooth Shareware. First Accessed on Mar. 25, 2011. Retrieved from the Internet: <http://www.blueshareware.com/lockitnow.asp> 5 pgs.

Non-Final Office Action from U.S. Appl. No. 13/438,656, dated Apr. 18, 2013 31 pgs.

U.S. Appl. No. 13/438,656, filed Apr. 3, 2012 by Vikram Aggarwal et al.

U.S. Appl. No. 13/438,676, filed Apr. 3, 2012 by Vikram Aggarwal et al.

Prosecution History from U.S. Appl. No. 13/438,676, from Sep. 19, 2013 through Oct. 3, 2016 58 pgs.

Prosecution History from U.S. Appl. No. 15/406,981, from Jan. 27, 2017 through Jul. 3, 2017 44 pgs.

Hardt, "The OAuth 2.0 Authorization Framework," RFC 6749, Internet Engineering Task Force (IETF), Oct. 2012, 76 pp.

\* cited by examiner

AUTHENTICATION ON A COMPUTING DEVICE

This application is a Continuation of U.S. application Ser. No. 15/406,981, filed Jan. 16, 2017, which is a Continuation of U.S. application Ser. No. 13/438,676, filed Apr. 3, 2012, the entire contents of which are hereby incorporated by reference.

TECHNICAL FIELD

This disclosure relates to authentication on a computing device.

BACKGROUND

Computing devices are often set up to require the use of a password to prove identity and/or gain access. However, repeated manual entry of passwords can become annoying and tedious. This may make people choose simple, short passwords, which are easily guessed, observed, or otherwise determined. In addition, users often have multiple computing devices that require authentication. In short, not requiring passwords is unsafe, yet requiring frequent password entry can be annoying.

SUMMARY

In general, this disclosure describes techniques for providing a user of a first computing device with the ability to authenticate themselves on a remotely provided process or service using a second computing device on which the user is already authenticated.

In one example, the disclosure is directed to a method. The method may comprise receiving, by a server device, an authentication request including a user id that identifies a user and a device id that uniquely identifies a first computing device from which the authentication request was received, transmitting, by the server device, the authentication request to a second computing device on which the user is currently authenticated to access at least one application provided by the server device, receiving an authentication acceptance key entered by the user from the second computing device, and in response to the authentication acceptance key, transmitting an authentication acceptance message that authenticates the user to access the at least one application provided by the server on the first computing device.

In another example, the disclosure is directed to a system comprising a server computer that provides at least one application that may be accessed by one or more computing devices, wherein the server receives an authentication request including a user id that identifies a user and a device id that uniquely identifies a first computing device from which the authentication request was received, transmits the authentication request to a second computing device on which the user is currently authenticated to access at least one application provided by the server device, receives an authentication acceptance key entered by the user from the second computing device, and in response to the authentication acceptance key, transmits an authentication acceptance message that authenticates the user to access the at least one application provided by the server on the first computing device. The second computing device may include one of a mobile phone, a smart phone, a personal digital assistant, a digital music player, or an e-reader. The first computing device may include one of a desktop computer, a laptop computer, or a tablet computer.

In another example, the disclosure is directed to a tangible computer-readable storage media encoded with instructions that cause one or more processors of a computing device to perform operations comprising receiving, by a server device, an authentication request including a user id that identifies a user and a device id that uniquely identifies a first computing device from which the authentication request was received, transmitting, by the server device, the authentication request to a second computing device on which the user is currently authenticated to access at least one application provided by the server device, receiving an authentication acceptance key entered by the user from the second computing device, and in response to the authentication acceptance key, transmitting an authentication acceptance message that authenticates the user to access the at least one application provided by the server on the first computing device.

In another example, the disclosure is directed to a method comprising transmitting, from a first computing device to a server computing device that provides at least one application to be accessed upon manual entry of authentication information into the first computing device, an authentication request including a user id that identifies a user and a device id that uniquely identifies the first computing device, receiving an authentication request acceptance indicative of acceptance of the authentication request by the user on a second computing device on which the user is currently authenticated to access at least one application provided by the server device, and in response to receipt of the authentication request acceptance, permitting the user to access the at least one application provided by the server computing device without requiring the manual entry of the authentication information.

In another example, the disclosure is directed to a method comprising receiving, by a second computing device, an authentication request including a user id that identifies a user and a device id that uniquely identifies a first computing device from which the authentication request was received, the authentication request indicative of a request to access at least one application provided by a server device from the first computing device, receiving, by the second computing device, an authentication acceptance key entered by the user into a user interface of the second computing device, and transmitting, by the second computing device, the authentication acceptance key to a server device from which the authentication request was received and on which the user is currently authenticated on the second computing device to access at least one application provided by the server device, the authentication acceptance key indicative of acceptance of the authentication request.

In another example, the disclosure is directed to a device comprising a user interface; and at least one processor that receives an authentication request including a user id that identifies a user and a device id that uniquely identifies a first computing device from which the authentication request was received, the authentication request indicative of a request to access at least one application provided by a server device from the first computing device, receives an authentication acceptance key entered by the user into the user interface, transmits the authentication acceptance key to a server device from which the authentication request was received and on which the user is currently authenticated on the second computing device to access the at least one application provided by the server device, wherein the authentication acceptance key is indicative of acceptance of the authentication request. The second computing device may include one of a mobile phone, a smart phone, a personal digital assistant, a digital music player, or an e-reader. The first computing device may include one of a desktop computer, a laptop computer, or a tablet computer.

The details of one or more examples are set forth in the accompanying drawings and the description below. Other features and advantages of the disclosure will be apparent from the description and drawings, and from the claims.

DETAILED DESCRIPTION

In general, this disclosure describes techniques for providing a user of a first computing device with the ability to authenticate themselves on a remotely provided process or service using a second computing device on which the user is already authenticated. For example, the techniques of this disclosure provide a user with the ability to securely log into a remotely provided service or application (such as e-mail, cloud computing service, etc.) on a first computing device (e.g., a desktop computer, laptop, tablet, etc.) using a second computing device (e.g., mobile phone) on which the user is already logged into the service or application, without requiring manual entry of authentication information on the first computing device. Second computing device 104 may include any type of computing device but in the examples described herein generally includes a wireless and/or mobile device such as a mobile phone, a smart phone, a personal digital assistant, a digital music player, an e-reader, or other type of mobile device.

Figure 1:
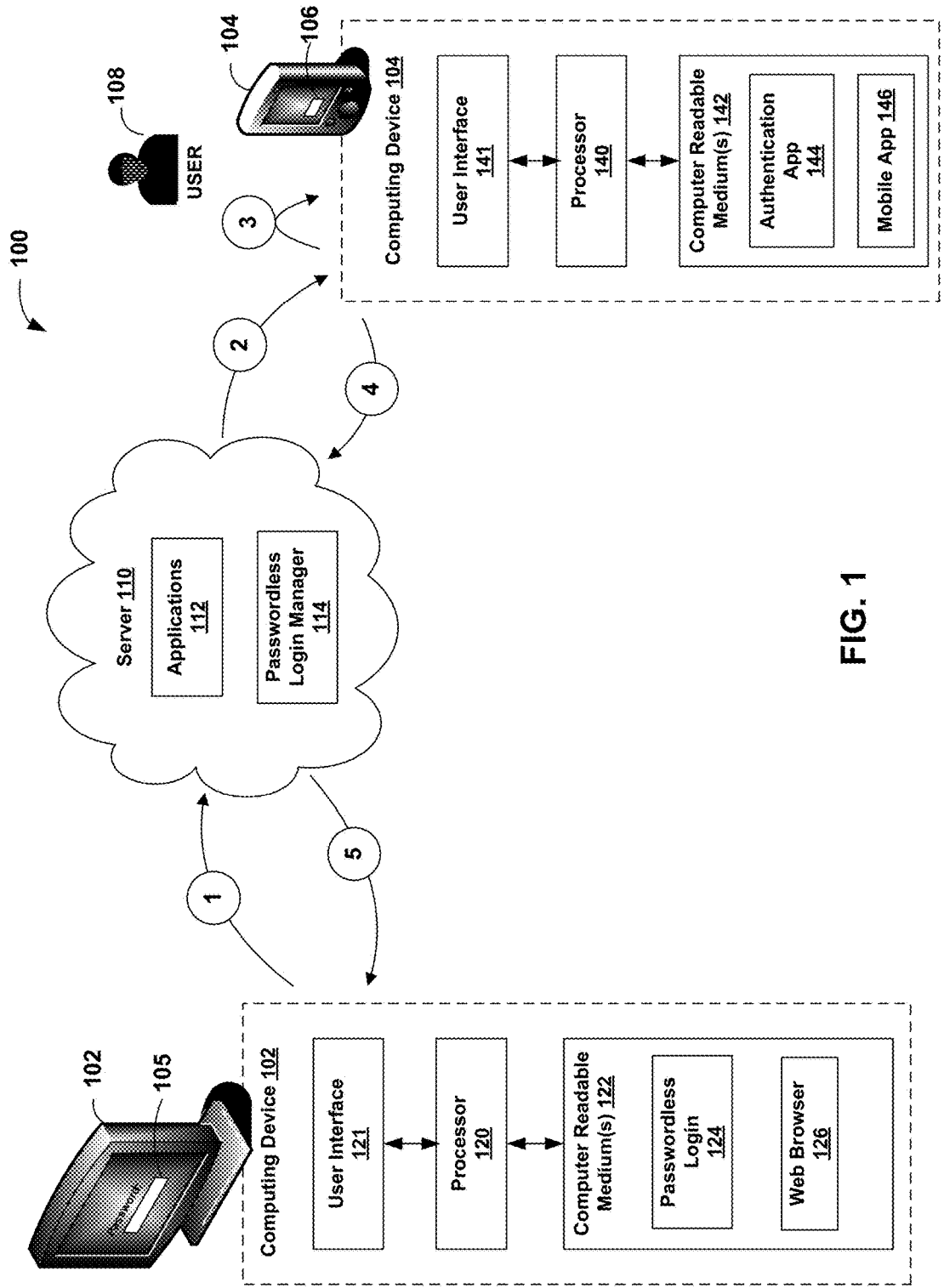
FIG. 1 is a block diagram illustrating an example system in which a user of a first computing device may be authenticated onto a remotely provided service or application using a second computing device on which the user has already been authenticated.

FIG. 1 is a block diagram illustrating an example system 100 in which a user of a first computing device may be authenticated onto a remotely provided service or application using a second computing device 104 on which the user has already been authenticated. A server 110 provides one or more applications or services 112 that are accessed by computing devices, such as first computing device 102 and second computing device 104, over a network, such as the Internet. Server 110 may provide computation, software applications, data access, data management, and/or storage resources without requiring users to know the location and other details of the computing infrastructure. Server 110 also includes a passwordless login manager application 114 that manages passwordless login between two or more computing devices.

For example, the one or more applications or services 112 provided by the server 100 may include an email application, a social networking application, a photo sharing application, a blog application, a discussion group application, a calendar application, an instant messaging application, cloud data storage, a secure website, and an e-commerce website. However, it shall be understood that these are but examples, and that many other types of applications or services may be provided by a server such as server 110.

Users of computing devices such as computing devices 102, 104 access server-based applications 112 through a web browser 126 or a mobile app 146 while the software and data are stored on the server at one or more remote locations.

First computing device 102 includes one or more processors 120, a user interface 121, and one or more computer readable media 122. User interface 121 may include, for example, a display, and may further include one or more input devices to enable a user to input data, such as a keyboard, mouse, track pad, touch screen, touch pad, microphone, camera, etc.

Computer readable media 122 may be configured to store information within first computing device 102. Computer readable media 122 may, in some examples, be described as a computer-readable storage media. In some examples, computer readable media 122 may include a temporary memory, meaning that a primary purpose of at least part of computer readable media 122 is not long-term storage. Computer readable media 122 may also include volatile memory, meaning that at least part of computer readable media 122 does not maintain stored contents when the computer is turned off. Examples of volatile memories include random access memories (RAM), dynamic random access memories (DRAM), static random access memories (SRAM), and other forms of volatile memories known in the art. In some examples, computer readable media 122 may be used to store program instructions for execution by processors 120. Computer readable media 122 may be used by software or applications running on target device 102 to temporarily or permanently store information used or generated during program execution. Computer readable media 122 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computer readable media 122 stores a web browser application 126. Web browser 126 is a software application that permits a user of first computing device 101 to access resources on the World Wide Web via a network such as the internet. For example, web browser 126 provides an interface between the user of first computing device and the server-based applications 112. Computer readable media 122 may also include a password-less login application 124 that permits a user of first computing device 102 to authenticate themselves on one or more of servers 110 or applications 112 using second computing device 104 on which the user has been previously authenticated.

Second computing device 104 includes one or more processors 140, a user interface 141, and one or more computer readable media 142. Second computing device 104 may also include a battery (not shown) or other mechanism for providing power to device 104. User interface 141 may include, for example, a display, keyboard, mouse, track pad, touch screen, touch pad, microphone, camera, etc. Computer readable media 142 may include one or more short or long term memory storage devices, such as volatile memories include random access memories (RAM), dynamic random access memories (DRAM), static random access memories (SRAM), and other forms of volatile memories known in the art. Computer readable media 142 may also include non-volatile storage elements, such as a subscriber identification module (SIM card), flash memories, or forms of electrically programmable memories (EPROM) or electrically erasable and programmable (EEPROM) memories, etc.

Computer readable media 142 stores a mobile application ("mobile app") 146. Mobile app 146 is a software application that permits a user of second computing device 104 to access resources on the World Wide Web via a network such as the internet. For example, mobile app 146 provides an interface between the user of second computing device and the server-based applications 112. Computer readable media 142 includes a password authentication application ("authentication app") 144 that permits a user to automatically authenticate themselves on another computing device (such as first computing device 102) without requiring the user to enter a password or other authentication information on the first computing device.

During a set-up phase, a user may establish passwordless login capability on second computing device 104 by initiating a passwordless login set-up session with server 110. Authentication app 144 on second computing device 104 and passwordless login manager 114 running on server 110 include the instructions to manage the set-up session. During the set-up session, server 110 may request that the user enter an authentication acceptance key that the user must enter in order to accept a passwordless login request. A screen may be presented on the user interface of second computing device 104 that permits the user to enter the authentication acceptance key. In general, the authentication acceptance key may be something relatively easier to remember and/or enter than the password required to initially gain access to the resources provided by server 110. The authentication acceptance key may include, for example, a relatively simple but unique pass code or pattern (e.g., connecting dots on a grid in a pattern, a sequence of 4 digits, selecting a picture from a group of pictures, etc) or other type of key that is relatively simple for the user to enter than the password that would ordinarily be required by the server.

Assume for purposes of illustration that a user 108 is currently authenticated for access to one or more applications 112 on server 112 on second computing device 104. That is, user 108 has previously entered a user name, password, and/or other authentication information to authenticate second computing device for access to one or more applications 112 provided by server 110, and is currently signed-in.

Now assume that user 108 desires to authenticate first computing device 102 for access to the same applications 112 provided by server 110, and thus requiring the same authentication information, for which second computing device 104 is currently authenticated. For example, assume that user 108 is currently signed-in to their email account on second computing device 104 (e.g., a mobile phone) and also wishes to sign-in to their email account on first computing device 102 (e.g., a desktop computer).

In this example, when user 102 attempts to access one or more applications 112 running on server 110 (e.g., by manually entering the required user input into the user interface 121 of first computing device), an authentication request (1) is sent from first computing device 102 to server 110 requesting access to the resource. The request (1) may typically include a user id (such as a username) associated with user 108 and a device id uniquely identifying first computing device 102.

Passwordless login manager 114 of server 110 may assign a request id that uniquely identifies the request (1). Information concerning the request, including the request id, is transmitted back to first computing device 102. Subsequently, first computing device may periodically check whether the request associated with the request id has been authenticated.

Passwordless login manager of server 110 further sends the authentication request (2), including the user id, device id, and request id to second computing device 104. Upon receipt of the request, authentication app 144 and mobile app 146 of second computing device 103 generate and present an authentication screen, such as text box 106, with which the user may accept and/or decline the authentication request. If the user desires to authenticate the request, the user may enter the authentication key determined during the set-up phase. Entry of the authentication key is indicated by (3) in FIG. 1. The user 108 may also decline the authentication, if desired.

Second computing device 104 transmits acceptance of the authentication request to server 110 (4), which records the authentication and forwards the authentication to first computing device 102 (5). As mentioned above, since generating the request (1) first computing device may have been periodically checking whether the request (1) has been authenticated. Upon receipt of the authentication (5), first computing device automatically signs-in the user to the desired one or more applications 112 provided by server 110.

Figure 2:
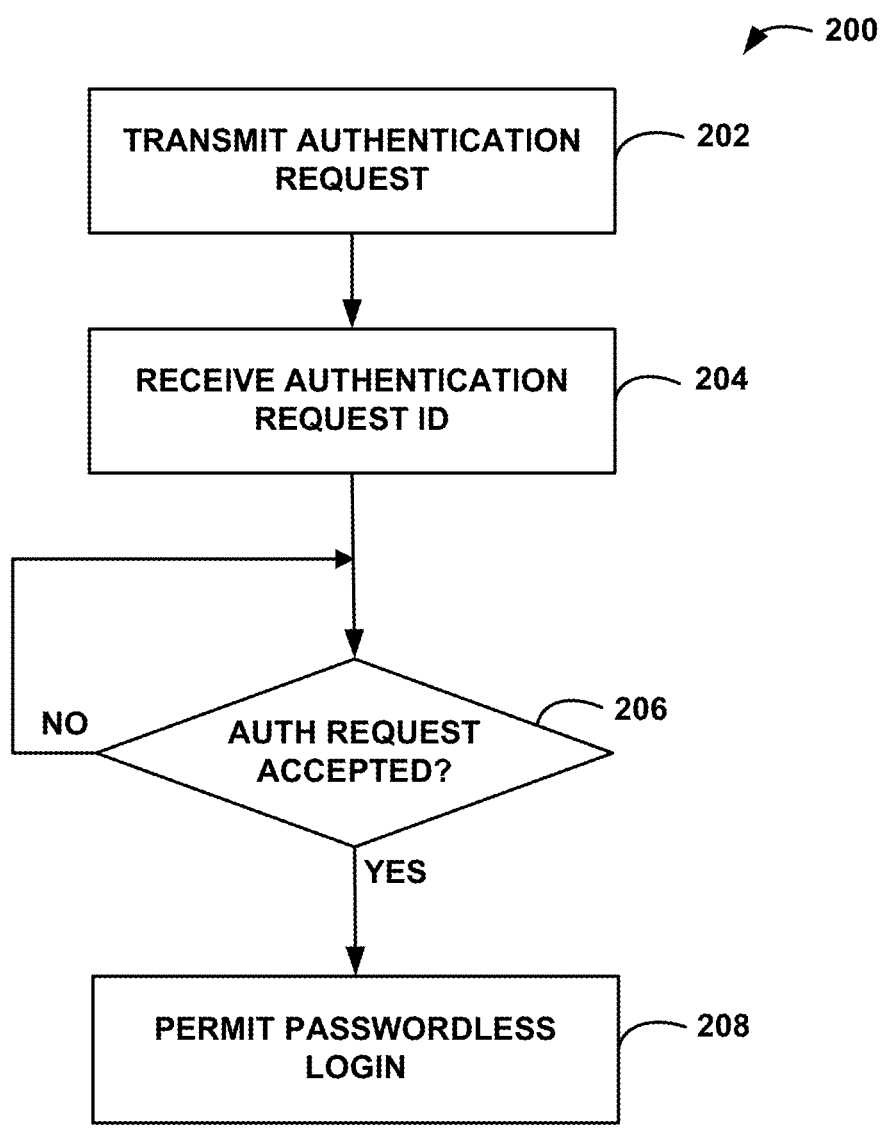
FIG. 2 is a flow diagram illustrating an example process by which a first computing device may be authenticated onto a remotely provided service or application using a second computing device.

FIG. 2 is a flow diagram illustrating an example process 200 by which a first computing device may be authenticated onto a remotely provided service or application using a second computing device 104. Example process (200) may be executed by processor(s) 120 of first computing device 102.

First computing device 102 transmits an authentication request to a remote server that provides the service or application to which the user wishes to access (202). First computing device 102 receives and store the authentication request id assigned and transmitted by server 110. Periodically, first computing device 102 checks whether or not the authentication request has been accepted (206). If the request has been accepted, first computing device 102 permits passwordless login to the appropriate service or application 112. If the request has not yet been accepted, first computing device continues to periodically check for the acceptance (206). In some examples, after a predetermined period of time, first computing device 102 may time out of the passwordless login attempt, and require that a password be manually entered in order to access the remotely provided service or application 112 on first computing device 102.

Figure 3:
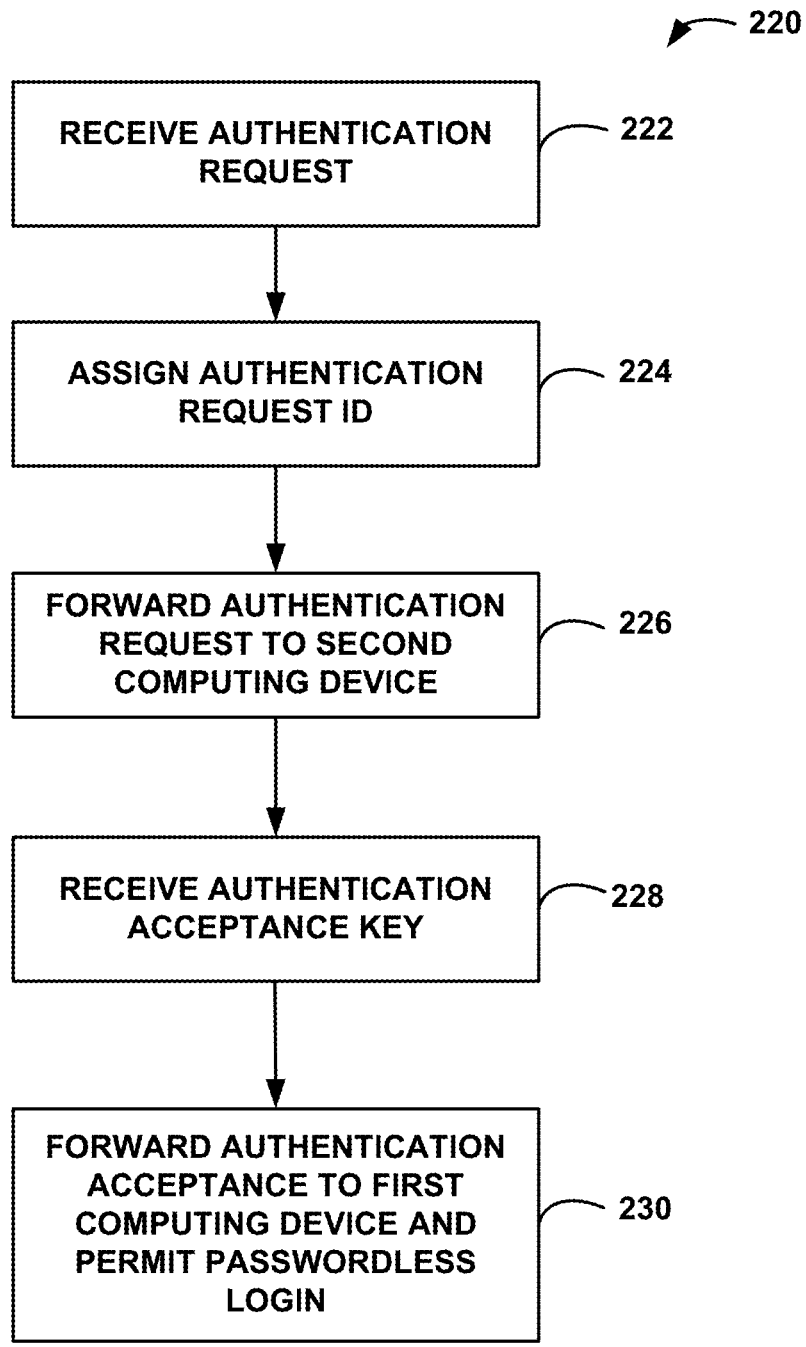
FIG. 3 is a flow diagram illustrating an example process by which a passwordless login manager application running on a server that provides access to one or more services or applications manages a passwordless login session.

FIG. 3 is a flow diagram illustrating an example process 220 by which a passwordless login manager application (e.g., 114) running on a server (e.g., 110) that provides access to one or more services or applications manages a passwordless login session between a first computing device (such as first computing device 102) and a second computing device (such as second computing device 104).

Server 110 receives an authentication request (222). The authentication request may include, for example, a user id and a device id. Server 110 assigns and authentication request id and transmits it back to the first computing device identified by the device id. Server 110 forwards the authentication request to the second computing device that is associated with the user id and on which the user is currently authenticated. This information is stored somewhere on the server 110 and is accessible by passwordless login manager 114 so that the authentication request may be forwarded to one or more associated computing devices.

At some point, the server will receive an acceptance of the authentication request from the second computing device (228). The server may then forward the acceptance of the authentication request to the first computing device requesting passwordless login, and may permit the passwordless login to occur (230).

Figure 4:
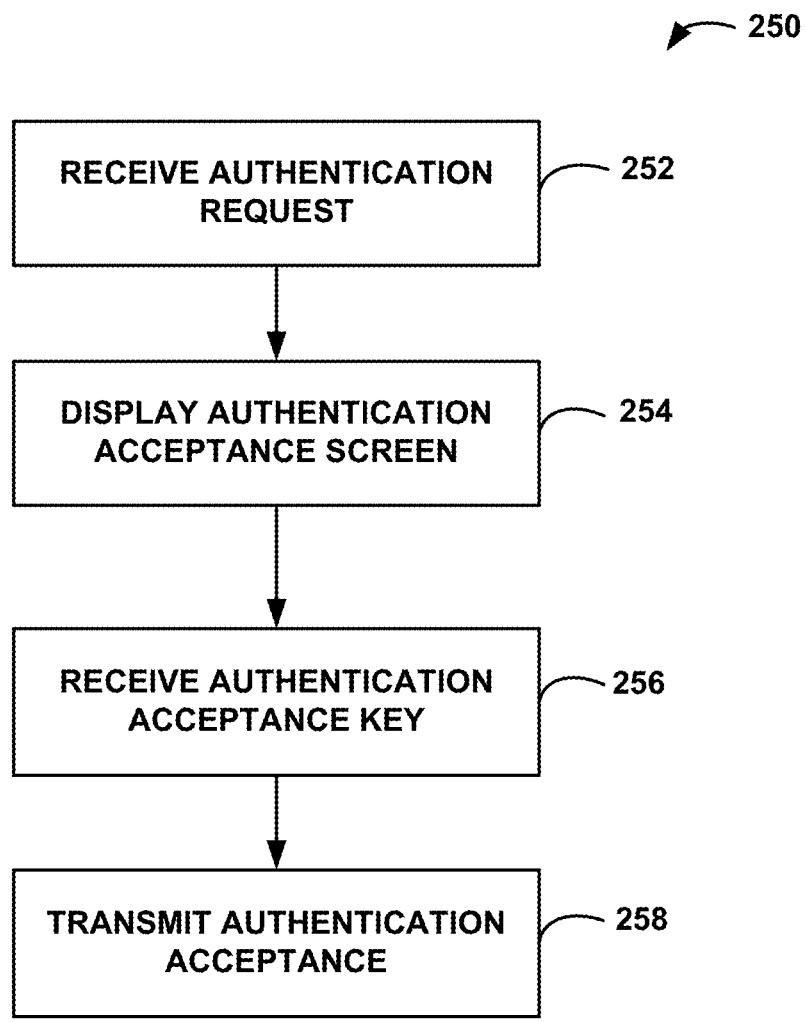
FIG. 4 is a flow diagram illustrating an example process by which a second computing device may authorize passwordless login on a first computing device to one or more services or applications provided by a remote server.

FIG. 4 is a flow diagram illustrating an example process 250 by which a second computing device may authorize passwordless login on a first computing device to one or more services or applications provided by a remote server. Second computing device receives the authentication request (252). The authentication request may include, for example, a user id, a device id that identifies the device (in this case, first computing device) that is attempting the passwordless login, and an authentication request id.

Second computing device displays an authentication acceptance screen on the user interface of the second computing device. For example, the authentication acceptance screen may request that the user enter and provide a mechanism through which the user may enter an authentication key. The authentication key is that which was determined during a previously executed set-up phase between the second computing device and the server. The authentication key may include, for example, a relatively simple but unique pass code or pattern (e.g., connecting dots on a grid in a pattern, a sequence of 4 digits, selecting a picture from a group of pictures, etc) or other type of key that is easier for the user to enter than the password that would ordinarily be required by the server.

Second computing device receives the authentication acceptance key (256). Second computing device transmits the authentication acceptance to the server from which the request was forwarded (258).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable media, such as a computer-readable storage media, containing instructions. Instructions embedded or encoded in a computer-readable media, including a computer-readable storage media, may cause one or more programmable processors, or other processors, to implement one or more of the techniques described herein, such as when instructions included or encoded in the computer-readable media are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, a computer-readable storage media may comprise a non-transitory media. The term "non-transitory" may indicate that the storage media is not embodied in a carrier wave or a propagated signal. In certain examples, a non-transitory storage media may store data that can, over time, change (e.g., in RAM or cache).

Various examples have been described. These and other examples are within the scope of the following claims.

The invention claimed is:

1. A method comprising:
receiving, by a computing system, from a first computing device, an authentication request to access an application or service provided by the computing system, the authentication request including a user id that uniquely identifies a user of the first computing device and a device id that uniquely identifies the first computing device;
responsive to receiving the authentication request, causing, by the computing system, a second computing device to present an authentication acceptance screen, wherein the user of the first computing device is already authenticated on the second computing device to access the application or service provided by the computing system when the computing system causes the second computing device to present the authentication screen;
after causing the second computing device to present the authentication acceptance screen, receiving, by the computing system, from the second computing device, a user response to the authentication acceptance screen;
determining, by the computing system, based at least in part on the user response to the authentication acceptance screen, whether to accept the authentication request; and
responsive to accepting the authentication request, granting, by the computing system, to the first computing device, access to the application or service provided by the computing system.

2. The method of claim 1, further comprising:
responsive to not accepting the authentication request, denying, by the computing system, to the first computing device, the access to the application or service provided by the computing system.

3. The method of claim 1, further comprising:
receiving, by the computing system, from the second computing device, an authentication acceptance key, wherein determining whether to accept the authentication request is further based at least in part on the acceptance key.

4. The method of claim 3, wherein the authentication acceptance key comprises one or more gestures detected at a touch screen of the second computing device while the second computing device presents the authentication acceptance screen.

5. The method of claim 3, wherein the authentication acceptance key comprises at least one of a password, a passcode, or an image selected by the user from among a plurality of images.

6. The method of claim 1, wherein the application or service provided by the computing system includes at least one of an email application, a social networking application, a photo sharing application, a blog application, a discussion group application, a calendar application, an instant messaging application, cloud data storage, a secure web site, and an e-commerce web site.

7. The method of claim 1, wherein the first computing device and the second computing device each include one of a mobile phone, a smart phone, a personal digital assistant, a digital music player, an e-reader, a desktop computer, a laptop computer, or a tablet computer.

8. The method of claim 1, wherein causing the second computing device to present the authentication acceptance screen comprises transmitting, by the computing system, to the computing device, information that causes the second computing device to display the authentication acceptance screen at a display screen of the second computing device.

9. A computing system comprising:
at least one processor configured to:
receive, from a first computing device, an authentication request to access an application or service provided by the computing system, the authentication request including a user id that uniquely identifies a user of the first computing device and a device id that uniquely identifies the first computing device;
responsive to receiving the authentication request, cause a second computing device to present an authentication acceptance screen, wherein the user of the first computing device is already authenticated on the second computing device to access the application or service provided by the computing system when the computing system causes the second computing device to present the authentication screen;
after causing the second computing device to present the authentication acceptance screen, receive, from the second computing device, a user response to the authentication acceptance screen;
determine, based at least in part on the user response to the authentication acceptance screen, whether to accept the authentication request; and
responsive to accepting the authentication request, grant, to the first computing device, access to the application or service provided by the computing system.

10. The computing system of claim 9, wherein the at least one processor is further configured to:
responsive to not accepting the authentication request, deny, to the first computing device, the access to the application or service provided by the computing system.

11. The computing system of claim 9, wherein the at least one processor is further configured to:
receive, from the second computing device, an authentication acceptance key, wherein the at least one processor is configured to determine whether to accept the authentication request further based at least in part on the acceptance key.

12. The computing system of claim 11, wherein the part of the authentication acceptance key comprises one or more gestures detected at a touch screen of the second computing device while the second computing device presents the authentication acceptance screen.

13. The computing system of claim 11, wherein the authentication acceptance key comprises at least one of a password, a passcode, or an image selected by the user from among a plurality of images.

14. The computing system of claim 9, wherein the application or service provided by the computing system includes at least one of an email application, a social networking application, a photo sharing application, a blog application, a discussion group application, a calendar application, an instant messaging application, cloud data storage, a secure website, and an e-commerce website.

15. The computing system of claim 9, wherein the first computing device and the second computing device each include one of a mobile phone, a smart phone, a personal digital assistant, a digital music player, an e-reader, a desktop computer, a laptop computer, or a tablet computer.

16. A method comprising:
accessing, by a second computing device, via a computing system, a remote application or service, wherein a user of the second computing device is authenticated by the computing system to access the remote application or service;
while the user of the second computing device is authenticated by the computing system to access the remote application or service, receiving, by the second computing device, from the computing system, an authentication request to access the application or service provided by the computing system that was transmitted by a first computing device, the authentication request including a user id that uniquely identifies the user of the second computing device as being a user of the first computing device and a device id that uniquely identifies the first computing device;
responsive to receiving the authentication request, displaying, at a touch screen of the second computing device, an authentication acceptance screen;
while displaying the authentication acceptance screen, detecting, by the second computing device, one or more gestures entered by the user at a region of the touch screen of the second computing device at which the authentication acceptance screen is displayed; and
responsive to detecting the one or more gestures, transmitting, by the second computing device, to the computing system, a user response to the authentication acceptance screen, wherein the computing system is configured to allow or deny access to the remote application or service from the first computing device based at least in part on the user response to the authentication acceptance screen.

17. The method of claim 16, wherein the computing system is configured to grant, to the first computing device, access to the application or service provided by the computing system in response to not accepting the authentication request.

18. The method of claim 16, wherein the computing system is configured to deny, to the first computing device, access to the application or service provided by the computing system in response to not accepting the authentication request.

19. The method of claim 16, further comprising:
further responsive to detecting the one or more gestures, transmitting, by the second computing device, to the computing system, an authentication acceptance key, wherein the authentication acceptance key comprises at least one of a password, a passcode, or an image selected by the user from among a plurality of images.

20. The method of claim 16, wherein the application or service provided by the computing system includes at least one of an email application, a social networking application, a photo sharing application, a blog application, a discussion group application, a calendar application, an instant messaging application, cloud data storage, a secure website, and an e-commerce website.

* * * * *